(12) United States Patent
Hanneken

(10) Patent No.: US 9,283,820 B1
(45) Date of Patent: Mar. 15, 2016

(54) WHEEL ASSEMBLY SERVICE MACHINE WITH BACK CONE CENTER CLAMP MECHANISM

(75) Inventor: Douglas S. Hanneken, St. Louis, MO (US)

(73) Assignee: Hunter Engineering Company, St. Louis, MO (US)

(*) Notice: Subject to any disclaimer, the term of this patent is extended or adjusted under 35 U.S.C. 154(b) by 963 days.

(21) Appl. No.: 13/451,148

(22) Filed: Apr. 19, 2012

Related U.S. Application Data

(60) Provisional application No. 61/488,577, filed on May 20, 2011.

(51) Int. Cl.
| B60C 25/132 | (2006.01) |
| B60C 25/138 | (2006.01) |
| B60C 25/02 | (2006.01) |

(52) U.S. Cl.
CPC ............ *B60C 25/132* (2013.01); *B60C 25/138* (2013.01); *B60C 25/025* (2013.01)

(58) Field of Classification Search
CPC .... B60C 25/132; B60C 25/138; B60C 25/02; B60C 25/025; B60C 25/142
USPC ........................... 157/1.24, 1.26, 1.36, 14–21
See application file for complete search history.

(56) References Cited

U.S. PATENT DOCUMENTS

| 4,304,285 | A | * | 12/1981 | Alm et al. ....................... 157/14 |
| 4,424,848 | A | | 1/1984 | Gore et al. |
| 4,905,815 | A | * | 3/1990 | Namiki et al. ................. 198/394 |
| 6,109,327 | A | | 8/2000 | Gonzaga |
| 6,516,855 | B2 | * | 2/2003 | Corghi ............................. 157/14 |
| 7,293,595 | B2 | * | 11/2007 | Gonzaga ......................... 157/14 |
| 7,784,519 | B2 | * | 8/2010 | Sotgiu ............................. 157/21 |
| 7,987,889 | B1 | * | 8/2011 | Story .............................. 157/14 |
| 8,011,412 | B2 | * | 9/2011 | Farley et al. ................... 157/14 |
| 8,453,702 | B2 | * | 6/2013 | Corghi et al. .................. 157/14 |
| 2010/0200174 | A1 | * | 8/2010 | Corghi et al. .................. 157/14 |

FOREIGN PATENT DOCUMENTS

EP 1612064 A1 1/2006

OTHER PUBLICATIONS

U.S. Appl. No. 12/495,847, filed Jul. 1, 2009.

* cited by examiner

*Primary Examiner* — Hadi Shakeri
*Assistant Examiner* — Danny Hong
(74) *Attorney, Agent, or Firm* — Bruce T. Atkins; Mark E. Books

(57) ABSTRACT

A center clamping mechanism for a wheel assembly service machine such as a tire changer machine includes a back cone centering element projecting outwardly from a platen and configured to engage a center bore of the wheel rim hub mount pad from an inner side of the hub mount pad. The centering element may include a compliant element configured to at least partially support the weight of the wheel rim and tire when being clamped. A pivot arm defines a contact surface for the inner side of the wheel rim hub mount pad, and when the tire is rotated by an operator with the inner side in contact with the contact surface, an anti-rotate pin carried on the pivot arm may be adjusted in radial position relative to the drive axis to accommodate different lug holes at varying lug bolt circle diameters.

13 Claims, 5 Drawing Sheets

US 9,283,820 B1

WHEEL ASSEMBLY SERVICE MACHINE WITH BACK CONE CENTER CLAMP MECHANISM

CROSS REFERENCE TO RELATED APPLICATIONS

This application claims the benefit of U.S. Provisional Patent Application Ser. No. 61/488,577 filed May 20, 2011, the disclosure of which is hereby incorporated by reference in its entirety.

BACKGROUND OF THE INVENTION

The field of the invention relates generally to wheel assembly service machines such as tire changer machines and wheel balancer machines, and more specifically to wheel assembly service machines having improved clamping features for retaining a wheel rim in a predetermined position.

Servicing of wheel assemblies including vehicle wheel rims and tires presents a number of problems to those in the industry. For example, the process of removing a tire from a wheel rim and replacing it with another tire, referred to herein as tire changing, can be difficult. In response to such difficulties, machines have been developed to facilitate the tire changing process. The machines commonly include a clamping mechanism and a drive assembly that rotates the wheel rim about an axis. A bead breaker tool exerts pressure on the tire adjacent the wheel rim to break the tire bead seal, and a tire removal tool, sometimes referred to as a demount tool, is used to pull the bead of the tire off the wheel rim as the wheel rim is rotated, allowing the tire to be separated from the rim for removal. Manual or machine implemented tools are also utilized to press the tire onto the wheel rim for installation. While known machines have obtained some level of success in reducing the time and labor associated with changing a tire, there remains room for improvement.

Wheel balancing machines, often referred to as wheel balancers, likewise commonly include a clamping mechanism and a drive assembly that rotates a wheel rim about an axis. Wheel balancing machines, to some extent, present similar problems and room for improvement exists.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
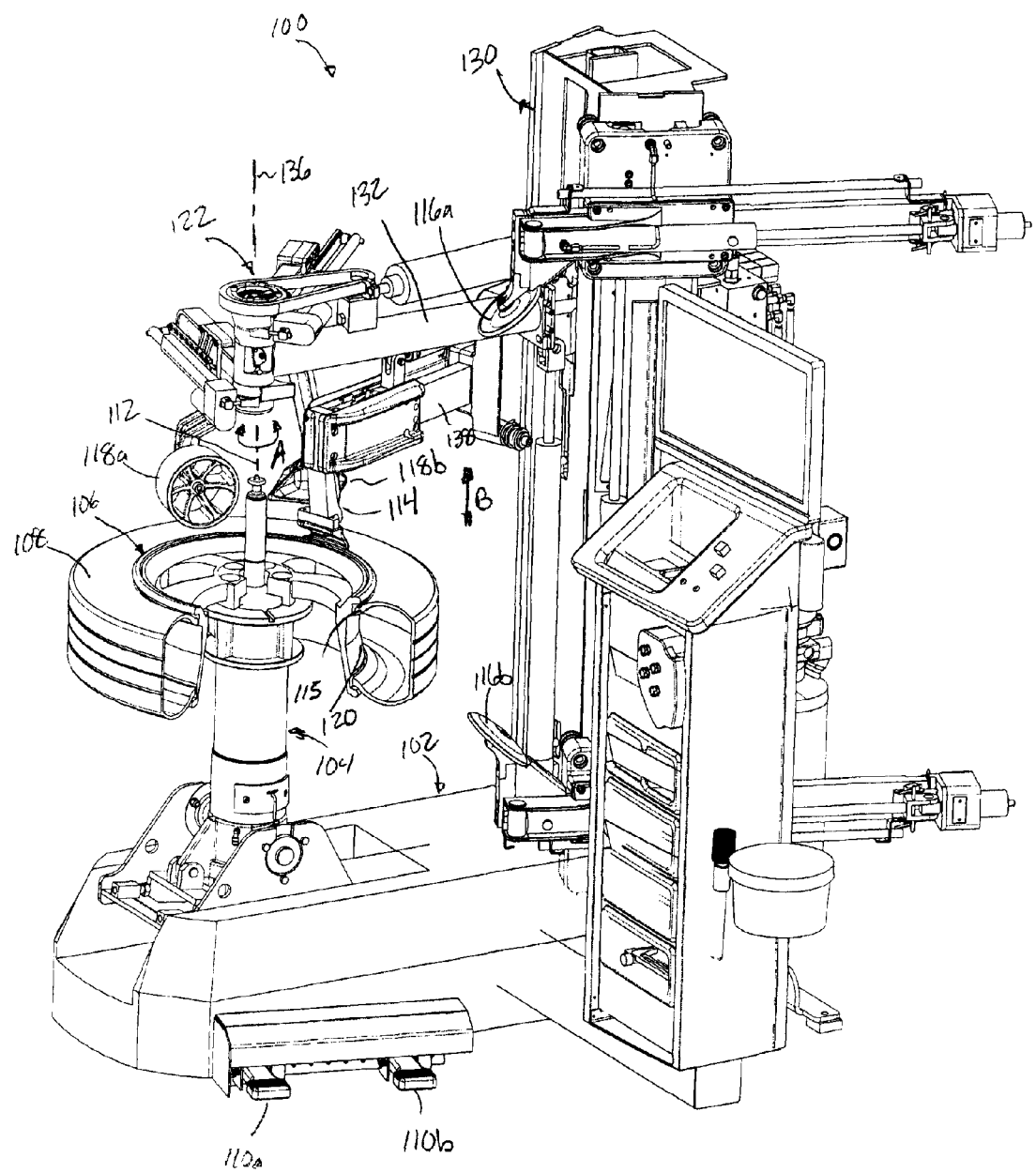
FIG. 1 is a perspective view of an exemplary embodiment of a wheel assembly service machine in the form of a tire changing machine.

Exemplary wheel assembly service machines such as tire changer machines are disclosed hereinbelow that overcome numerous difficulties and disadvantages in the art. In order to understand the invention to its fullest extent, some discussion of the state art and difficulties associated therewith is warranted. Accordingly, Part I below discusses the state of the art and associated problems and disadvantages, while Part II below describes exemplary embodiments of the invention and related methods that overcome difficulties and drawbacks of the state of the art.

Part I: Introduction to the Invention

Conventional tire changer machines typically include clamping mechanisms acting on the outer periphery of a wheel rim where it meets the tire. Such clamping mechanisms typically apply radial force on the outer circumference of the wheel rim to hold the wheel rim in a predetermined, stationary position relative to the drive assembly of the tire changer machine. As such, when the drive assembly is rotated, the wheel rim rotates with it so that the machine tools may appropriately be utilized to mount and demount tires. Because of the clamping mechanism, relative rotation of the wheel rim with respect to the drive assembly is prevented that could defeat the operation of the machine.

In recent times a great variety of sizes in wheel rims and tires are being utilized as both original equipment and after market accessories for vehicles. Accommodating the wide variety of wheel rims and tire sizes with conventional tire changing machines is difficult. Conventionally, machines have been designed predominately for so-called "standard" tire and rim sizes and the clamping features were designed accordingly to engage the outer periphery of standard wheel rims. It is, however, common nowadays for many vehicle repair shops or retail tire dealers to routinely encounter tires and rims that deviate, sometimes greatly, from the standard sizes for which conventional machines have been designed. For example only, the outer circumference and/or the width of some rims and tires may extend to and beyond the capabilities of many known machines, making it difficult, if not impossible, to change tires on certain sizes of rims with conventional, radial clamping-types of machines including clamping elements acting on the outer periphery of wheel rims.

Especially for over-sized wheel rims and tires, proper clamping of the wheel rims to the machine may not be possible with conventional radial clamping machines that were designed for smaller rims and tires. If such wheel rims can be clamped at all with known machines, they are susceptible to scratching or disfiguring the rim. The wheel rims, however, can be expensive and any damage to them during tire changing is simply unacceptable. Over-sized tires can also be heavy and particularly difficult to handle for machine operators. While some machines have been provided with tire lifts in an attempt to address such concerns, they often have been designed for specific sizes of tires and have so far not proven to be of great benefit for over-sized rims and tires.

Of course, rims and tires that are smaller than existing machines were designed to accommodate also present difficulties and concerns. For many repair shops and tire and rim retailers, acquiring multiple machines for different sizes of rims and tires is neither practical nor desirable.

To address the problems discussed above, more recent state-of-the-art tire changer machines include center clamping-type elements wherein wheel clamping features extending through and acting upon a center aperture, opening, or bore of the hub mount pad of the wheel rim that attaches to the vehicle in use. As such, the wheel rim may be mounted to the machine via the central hub mount pad rather than the outer periphery of the wheel rim where it meets the tire. The variation in the center opening of the hub mount pad is much less than the variation in the outer diameter of the wheel rim and thus many of the problems associated with radial clamping at the outer periphery of the wheel rim may be avoided. While such center clamping features are much more versatile to change tires on wheel rims having great variation in outer diameters, they remain disadvantaged in certain aspects and improvements are desired.

In a typical center clamping-type machine, a threaded drive shaft is extended through the center bore of the hub mount pad of the wheel rim. The inner side of the hub mount pad rests upon a platen of the drive assembly, with the end of the drive shaft projecting above the hub mount pad and the outer side of the hub mount pad exposed. A threaded coupler is provided for engagement with the shaft, and when the coupler is tightened, a clamping downforce may be generated that securely retains the hub mount pad of the wheel rim in position between the platen and the coupler. For proper operation of the machine tools, however, the wheel rim must be accurately centered with respect to the drive shaft.

Accordingly, in known center clamp-type machines, the threaded coupler may be cone-shaped on its end that engages the outer side of the wheel mount pad. As the coupler is engaged to the drive shaft and turned to advance the coupler on the threaded distal end of the drive shaft toward the hub mount pad, the cone-shaped end of the coupler aligns and centers the hub mount pad with respect to the drive shaft assembly. More specifically, the cone-shaped coupler engages a threaded end of the drive shaft assembly that, as described above, also extends through the center bore in the hub mount pad of the rim as the tire changer machine is used. The coupler may be hand turned about the longitudinal axis of the drive shaft by a machine operator to advance the coupler on the threaded distal end of the drive shaft assembly. Handles may be provided on the coupler to assist the operator in advancing the cone-shaped end of the coupler toward the hub mount pad. Such couplers are sometimes referred to as a "speed nut" and are conveniently used to mount wheel rims in a self-centering manner from the user's perspective.

By applying the clamping force to the hub mount pad instead of the circumferential periphery of the rim, and also by using a self-centering coupler such as that described above, rather relatively complicated centering and gripping mechanisms known in the art for clamping the outer periphery of the rim where it meets the tire can be avoided. Also, because the clamping force is applied to the hub mount pad at the center of the rim, such center clamp machines can be substantially universally used with wheel rims and tires having greatly varying outer diameters and circumferences, as opposed to radial clamping machines that are practically limited to satisfactory use with a predetermined and much smaller range of wheel rims and tires.

To further prevent relative rotation of the wheel rim in such center clamp machines, a lug hole in the hub mount pad may be further engaged with an anti-rotate pin provided on or near the platen of the drive assembly. Most often, the anti-rotate pin is inserted through one of the lug holes in the hub mount pad from below the inner side of the hub mount pad that normally faces the vehicle in use. Alternatively, however, anti-rotate pins may be extended through one of the lug holes in the hub mount pad from above to ensure that the hub mount pad cannot rotate relative to the platen.

In some known machines, the anti-rotate pin may be provided on a swinging arm allowing the radial position of the anti-rotate pin relative to the center of the drive shaft to be adjusted and therefore accommodate some variation in the lug hole bolt circle diameters of various wheel rims. As such, the anti-rotate pin that is carried on the swing arm can be selectively positioned relative to the platen of the drive shaft assembly and the longitudinal center axis of the drive shaft. As the swing arm is rotated, the anti-rotate pin traverses an arcuate path that allows the anti-rotate pin to extend at varying radial distances from the center axis of the drive shaft. The anti-rotate pin can accordingly engage lug holes of different hub mount pads on different sizes of wheel rims at varying radial distances from the center bore of the hub mount pad.

While such a swinging arm, anti-rotate pin design is relatively versatile to accommodate wheel rims of varying size and lug hole bolt circle diameters, such positionable anti-rotate pins can be difficult to successfully align with the lug holes of any given wheel rim in actual use. In any given attempt to mount a wheel rim to the platen, the actual location of the anti-rotate pin may not be close to the required lug bolt circle of the lug-hole pattern on the hub mount pad. In such circumstances, successfully aligning the anti-rotate pin with a lug hole in the hub mount pad of the wheel rim can be difficult to accomplish, especially for relatively heavy wheel rim and tire assemblies. The wheel assembly must typically be moved side-to-side by a machine operator until the lug hole can be engaged with the anti-rotate pin. This presents practical challenges, especially so for larger and heavier wheel rims and tires.

For anti-rotation pins extendable through a lug hole from a position below the hub mount pad, the operator may resort to awkwardly reaching under or through the wheel rim to physically position the anti-rotate pin to the correct radial location, while simultaneously lifting the wheel rim and tire assembly off the platen near the anti-rotate pin so that it can be extended through a lug hole. Some amount of trial and error may result in attempting to do this, especially when the operator's line of sight to confirm the location of the lug hole and/or the position of the anti-rotate pin is not entirely clear. This presents a cumbersome task for machine operators, and is severely complicated when heavy wheel rim/tire assemblies are involved.

For anti-rotation pins extendable through a lug hole from a position above the hub mount pad, still other complications and difficulties can arise. The swing arm must be mechanically anchored to the remainder of the assembly in order to work. In known assemblies of this type, the anti-rotate pin extends through a lug hole and mates with a groove in the platen to secure the position of the hub mount pad relative to the platen. U.S. Pat. No. 6,516,855 and EP 1 612 064 describe exemplary anti-rotation pin assemblies of this type. Misalignment of the lug holes in the hub mount pad of any given wheel rim and groove in the platen may still occur, however, and some trial and error in installing the anti-rotate pin may result. This is especially unfortunate when the operator does not realize the misalignment until the self centering coupler is fully engaged, as in that the case the operator will need to loosen the self centering coupler before the wheel rim can be rotated to the proper position.

When anti-rotate pin assemblies are provided as separate but attachable elements to the machine drive assembly, repeated installation and removal of the swing arm and anti-rotate pin negatively impacts the operator's efficiency in using the machine and prolongs the time required to complete a tire change procedure. Additionally, the swing arm and anti-rotate pin assembly must be safely stored when not in use. If damaged or lost, the machine may become practically unusable.

Furthermore, because the self-centering, cone-shaped couplers physically contact the outer side of the hub mount pad in use, there remains potential for the wheel rim to be damaged. The cone-shaped end of the coupler used with center clamp type machines may damage the surface finish on the outer side of the hub mount pad proximate the center bore, either from improper use or simply because of the large forces generated by the machine in changing tires. For cast wheel rims, potential damage can be much more severe. In view of the rather costly wheel rims available both as original equipment and as aftermarket equipment for modern vehicles, any damage to a wheel rim may be highly problematic.

Part II: Inventive Wheel Assembly Service Machines and Clamping Mechanisms

Exemplary embodiments of wheel assembly service machines such as tire changer machines and tool assemblies therefore are described below that overcome the difficulties and disadvantages explained above. While described in the context of a tire changer machine, the concepts applied herein may be applied to other types of wheel assembly service machines, including but not limited to wheel balancer machines presenting similar clamping and centering difficulties for servicing wheel rim and tire assemblies. Method aspects will be in part apparent and in part specifically discussed in the disclosure below.

FIG. 1 illustrates an exemplary wheel assembly service machine in the form of a tire changing machine 100 including a frame or base 102 and a rotatable drive shaft assembly 104 attached to the base 102. The drive shaft assembly 104 may include a post or shaft positioned centrally on the base 102, and the drive shaft assembly 104 is adapted to receive and retain a wheel rim 106 having a tire 108. The wheel rim 106 may be secured to the drive shaft assembly 104 with a clamping mechanism, described below, after the wheel rim 106 and tire 108 is loaded and mounted onto the machine 100.

After the wheel rim 106 is clamped in position, a machine operator manipulates an input selector 110a which operates the drive shaft assembly 104 to rotate the wheel rim 106 and tire 108 about a drive axis 112. In different exemplary embodiments, the drive shaft assembly 104 may be pneumatically or hydraulically actuated or powered electrically. In another embodiment, a rotating turntable or other mechanism may be provided in lieu of the drive shaft assembly 104. Clockwise and counterclockwise rotation about the axis 112, indicated by the arrow A, are possible in different embodiments.

While the drive axis 112 is illustrated as being generally vertical in the embodiment depicted, the axis 112 may be oriented horizontally or otherwise in other embodiments, and the axis 112 may be selectively positionable in different positions relative to the base 102.

As the wheel rim 106 is rotated about the axis 112 as shown by arrow A, a tool assembly 114 may be brought into physical contact or engagement with the tire 108 in the direction of arrow B at respective locations proximate an outer periphery of the rim 106. With the tool assembly 114 in the proper position with respect to the tire 108 and wheel rim 106, the tire 108 and wheel rim 106 are rotated about the axis 112 in the clockwise or counterclockwise direction of arrow A with the tool assembly 114 engaged to the tire 108 to demount the tire 108 as explained below. Additionally, the tool assembly 114 may be utilized to mount a tire 108 to the wheel rim 106.

The tool assembly 114, as further described below may include features to separate or displace an inner circumference of the tire 108 including the tire bead 115 over the outer lip of the wheel rim 106 to remove the tire 108, or to engage the inner circumference of the tire 108 including the bead 115 on the outer lip of the wheel rim 106 to install the tire 108. The tire 108 may be appropriately lubricated to facilitate easier removal and installation using the tool assembly 114.

Machine tools 116a, 116b are provided, and sometimes referred to as bead breaker tools that exert pressure on the tire 108 to either break the tire bead seal with the rim 106 or push or displace the inner circumference of the tire 108 over the outer lip of the wheel rim 106 to install the tire 108. As shown in the exemplary embodiment in FIG. 1, two tools 116a and 116b are shown, one located above the tire 108 and the other located below the tire 108. In another embodiment, a single bead breaker tool 116 could be provided.

Machine tools 118a and 118b are also provided and sometimes are referred to as pressing tools, pusher tools, or bead pressing devices. As shown in the exemplary embodiment in FIG. 1, bead pressing devices 118a, 118b are shown that exert pressure on the tire sidewall in tire mounting and demounting procedures. In the exemplary embodiment shown differently configured bead pressing devices 118a and 118b are shown.

The bead pressing device 118a, is a roller device that is mounted for rotation about an axis that is substantially perpendicular to the machine drive axis 112. Thus, when the roller device 118a is placed in contact with the tire sidewall, it may rotate about its axis as the tire 108 is rotated about the machine drive axis 112 while the rotational axis of the device 118a remains in a fixed position relative to the machine drive axis 112. When desired, the roller device 118a is also operable wherein it may rotate in tandem with the tire 108 about the drive axis 112.

The bead pressing device 118b is adapted for contact with the tire 108 and includes a frictional engagement surface to facilitate movement relative to the tire. When engaged to the tire sidewall, the pressing device 118b rotates about the drive axis 112 with the tire 108. Optionally the pressing device 118b may incorporate a feature that engages a spoke, a hole, or other feature of the wheel rim 106 to ensure that the pressing device 118b (and also the tire 108 with which it is engaged) rotates along with the wheel rim 106 and that the pressing device 118b does not move relative to the wheel rim 106. Alternatively, the pressing device 118b may optionally be coupled with an independent drive mechanism 122 that pushes the bead pressing device 118b and the tire 108 in the direction of rim rotation about the drive axis 112. This is sometimes referred to as establishing a "traction point" in addition to pushing the tire bead into the drop center of the wheel rim 106 when mounting the tire 108.

The pressing tools 118a, 118b may be spaced from one another to maintain the tire bead 115 in the drop center 120 of the wheel rim 106 during tire demounting procedures, or to push the tire bead 115 into the drop center 120 of the wheel rim 106 in a tire mounting procedure. While two bead pressing devices 118a and 118b are shown in FIG. 1, additional bead pressing devices 118 may be provided. Two or more bead pressing devices 118 are beneficial for mounting or demounting larger diameter tires and stiffer tires, although it is understood that in some cases a single bead pressing device 118 may be sufficient to mount or demount certain types of tires.

The tool assembly 114, and the tools 116, 118 serve to supply sufficient tire insertion or removal forces at the correct angle and location with respect to the tire 108 such that the bead 118 of the tire 108 is forced out of or onto a bead seat on the wheel rim 106. While exemplary tools 116, 118 are illustrated in combination with the tool assembly 114, still other tire changing tools and devices may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to or in lieu of the tools 116, 118 as depicted.

To assist with locating the tool assembly 114 and the tools 116, 118 a sensory capability may further be provided in the machine 100 to detect a position of the tool assembly 114 and the tools 116, 118 (or perhaps other tools that may be provided) with respect to the tire 108 and/or wheel rim 106. For example, one known tire changing machine includes a switch mechanism that changes state when a bead breaker tool is moved just beyond an outer edge of the wheel rim, ensuring that the bead breaker tool is positioned to engage a tire at a predetermined location. Machine vision systems are also known that help align the machine tools with respect to the wheel rim and/or tire at predetermined locations. As another example, force feedback sensors may be integrated as further monitoring and control features for the machine components, including but not limited to the machine tools, in use. While such sensory capabilities may be beneficial, in some embodiments they may be considered optional and accordingly not be utilized.

The exemplary machine 100 as shown also includes a support tower 130 extending from the base 102 at a location spaced from the drive assembly 104, and the support tower 130 extends to a height well above the tire 108 and wheel rim 106. A linkage 132 extends outwardly from the support tower 130, and the pressing tools 118a, 118b are coupled to the linkage 132. The linkage 132 is movable by an actuator on the support tower 130 in a direction parallel to arrow B in FIG. 1, such that as the linkage 132 is moved, the bead pressing devices carried on the linkage 132 are moved toward or away from the tire 108. As such, the bead pressing devices 118a, 118b may be moved in a direction parallel to the machine drive axis 112.

Also, the bead pressing devices 118a, 118b are mounted to the linkage 132 such that they are rotatable about an axis 136 that is fixed and coincident with the machine drive axis 112 in a tire change procedure. That is, the pressing devices 118 are rotatable about the axis 136 that is coaxial with the machine drive axis 112. As such, because the axis 136 is coincident with the drive axis 112, when the bead pressing devices 118 are in contact with the tire 108, the bead pressing devices 118 may rotate with the tire 108 as it is rotated about the drive axis 112. Unlike conventional tire changing machines, including but not limited to so-called swing-arm style machines, the rotational axis 136 for the pressing devices 118 is fixed at a set distance and location from the tower support frame 130 in an exemplary embodiment. A more compact machine arrangement and work area is therefore provided compared to some conventional machines.

While locating the rotational axis 136 of the pressing devices 118 at a fixed and set distance and location from the tower support frame 130 can be beneficial for the reasons stated, it is recognized that in further and/or alternative embodiments neither the location of the drive axis 112 nor the rotational axis 136 for the pressing devices need necessarily be fixed in such a manner so long as the axes 112 and 136 are positionable to become coincident when the pressing devices 118 are needed. That is, either or both of the axes 112 and 136 may be movable to different operating positions, distances, and orientations relative to each other and relative to the tower support frame 130 for reasons not pertinent to use of the pressing devices 118a, 118b. When the pressing devices 118a, 118b are to be engaged to the tire, however, the axes 112 and 136 are movable relative to one another to become coincident once again so that the bead pressing devices 118 may rotate with the tire 108 about the drive axis 112.

The bead pressing devices 118a, 118b are further movable in a direction perpendicular to the axis 136 and the drive axis 112. That is, actuators are provided that move the bead pressing devices 118a, 118b toward and away from the drive axis 112, such that the bead pressing devices 118 may be manually or automatically adjusted to different radial positions measured from the drive axis 112 to accommodate tires and rims of different diameters. The bead pressing devices 118 may also be manually or automatically positioned in the direction perpendicular to the drive axis 112.

The bead breaker tools 116a, 116b are also coupled to and supported by the tower support frame 130 (or other support structure in an alternative embodiment) via linkages that also movable in vertical and horizontal directions to position the bead breaker tools 116a, 116b relative to the wheel rim 106 and tire 108 for use.

The tool assembly 114 is likewise coupled to a support 138 and associated linkages on the tower support frame 130, such that the support 138 is movable relative to the tower support frame 130 with actuators in vertical and horizontal directions. As such, the tool assembly 114 is movable toward and away from the drive axis 112 in a radial direction, and toward and away from the tire 108 and wheel rim 106 in a direction parallel to arrow B. The tool assembly 114 in the illustrated embodiment is independently positionable from the tools 116, 118, although it is understood that the assembly 114 and the tools 116, 118 may be used in concert while changing the tire 108. Also, while the tool assembly 114 and the tools 116, 118 are all coupled to the same tower support frame 130 in the exemplary embodiment depicted, they could alternatively be supported with independent support frames and structure that is separately provided on the machine 100 in view of a single tower support frame 130.

The positions of the tool assembly 114 and the tools 116, 118, and operation of the drive assembly 104 and other features of the machine 100 may be coordinated by a control unit that may include a controller and actuator components operatively connected to the controller.

A machine operator may manipulate input selectors 110a, and 110b, for example, which communicate with the control unit to move the tool assembly 114, and the tools 116, 118 to desired positions and/or to operate the drive assembly 104 or activate other machine features. In illustrative embodiments, the input selectors 110a, 110b may be foot pedals located near the bottom of the machine base 102 for convenient use of the machine operator(s). In other embodiments, other known input selectors, including but not limited to levers, buttons, knobs, switches, joysticks, and touch sensitive screens may be employed in various locations on or near the machine 100. An operator station including a display and an input device including a keyboard or other input selectors may be optionally provided for the benefit of the operator. Still other features of the machine may be provided, such as tire inflation systems and the like familiar to those in the art.

For optimal operation and effectiveness of the machine tools to change tires, accurate centering of the wheel rim 106 and tire 108 is needed, while still allowing for a good deal of variation in the sizes of wheel rims and tires that the machine 100 can capably handle. Moreover, to maximize efficiency of the machine 100 to change tires, the machine operator needs to easily effectively clamp the wheel rim 106 to the drive assembly 104 in a reduced amount of time. Reconciling the competing goals of achieving quick and easy clamping, without sacrificing accuracy of centering the wheel rim and tire, and while effectively providing flexibility to clamp a wide variety of wheel rims and tires has until now been an elusive proposition. The inventive clamping mechanism described below, however, capably solves these and other longstanding issues in the art.

Figures 2, 3:
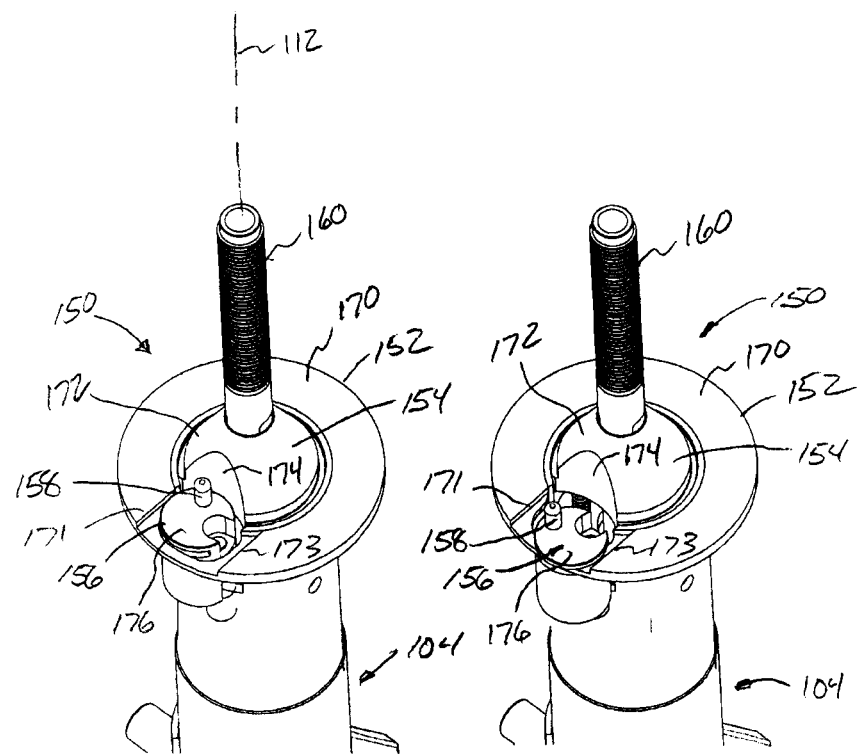
FIG. 2 is a perspective view of a portion of a clamping mechanism for the machine shown in FIG. 1 in a first operating position.
FIG. 3 shows the clamping mechanism shown in FIG. 2 in a second operating position.

FIGS. 2 and 3 are perspective views of a portion of the drive shaft assembly 104 including an exemplary center clamping mechanism 150. FIG. 2 shows the center clamping mechanism 150 in a first operating position and FIG. 3 shows the center clamping mechanism 150 in a second operating position as described below. FIGS. 4-7 show various views of the center clamp mechanism 150 in action to mount a wheel rim 106 and tire 108.

The clamping mechanism 150 generally includes a platen 152, a centering cone 154, a pivot arm 156 and an anti-rotate pin 158 for securing a wheel rim in position on the drive shaft assembly 104. As also shown in FIGS. 2 and 3, the drive shaft assembly 104 includes a threaded shaft 160 that is rotatable about the drive axis 112. The shaft 160 projects axially above the centering cone 154 and may be extended through a center bore 162 (FIGS. 4 and 5) of a wheel rim hub mount pad 164 to mount the wheel rim 106 and tire 108 (FIG. 1) to the drive shaft assembly 104.

Figure 4:
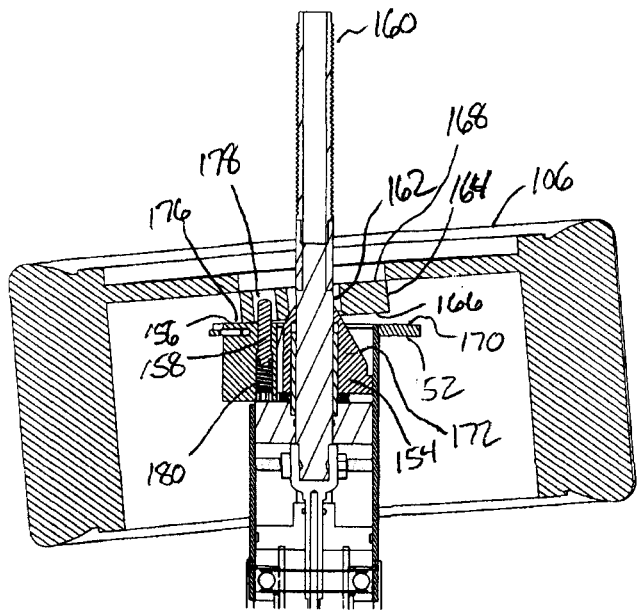
FIG. 4 is a cross sectional view of the clamping mechanism shown in FIGS. 1 and 2 with a wheel rim and tire being mounted thereon.
Figure 5:
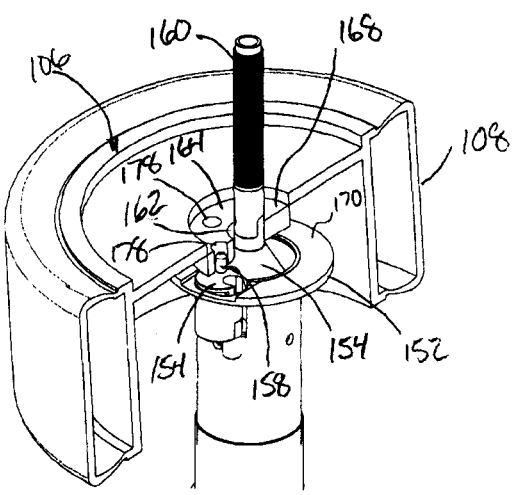
FIG. 5 is a partial perspective view of the wheel rim and tire engaged to the clamping mechanism.

As shown in FIGS. 4 and 5, the wheel rim hub mount pad 164 includes an inner side 166 that is normally attached to the vehicle in use, and an outer side 168 that faces outwardly from the vehicle when attached thereto. The inner side 166 is sometimes referred to as a "back" side, and the outer side 168 is sometimes referred to as a "front" side. The inner or back side 166 of the wheel rim hub mount pad 164 is not visible when the wheel rim 106 is attached to the vehicle. The outer side or front side 168 and adjacent areas of the wheel rim hub mount pad 164 is visible when the wheel rim 106 is mounted to the vehicle, however, and accordingly is typically finished to an attractive appearance that is preferably undamaged when changing the tire 108. For example, the outer or front side 168 may be highly polished and/or painted to accent the vehicle. Accordingly, the clamping mechanism 150, via the centering cone 154 engages the inner side 166 of the wheel rim hub mount pad 164, rather than the outer side 168, and effectively avoids any likelihood of scuffing, scratching, disfiguring, or otherwise damaging the finished outer side of the wheel rim.

The platen 152 is fastened to the drive shaft assembly 104 such that it is rotatable about the drive axis 112 together with the shaft 160 as the machine 100 is used. The platen 152 as shown in the exemplary embodiment in the Figures defines a generally annular bearing surface 170 that contacts and supports the inner side 166 of the wheel rim hub mount pad 164 as the machine 100 is used. The bearing surface 170 extends in a plane perpendicular to the drive axis 112, is generally smooth, and provides intimate surface contact with the inner side 166 of the wheel rim hub mount pad 164. In the example shown, the platen bearing surface 170 extends continuously and circumferentially from a first edge 171 to a second edge 173 and completes a bit less than a complete 360° revolution on the platen 152. In the example shown, the edges 171, 173 are straight and parallel (i.e., not curved), and a recess extends between the first and second edges 171, 173. The pivot arm 156 occupies the recess and extends nearly the entire distance between the edges 171, 173. While a specific, exemplary configuration of the platen 152 is shown, variations are contemplated in further and/or alternative embodiments. For example other, non-annular geometric shapes of the bearing surface 170 may alternatively be defined, including but not limited to rectangular shapes, octagonal shapes, etc. Further, the recess between the edges 171, 173 may be considered optional in creation embodiments and need not be used.

The centering element 154 in the exemplary embodiment shown generally occupies a central interior area defined by the annular bearing surface 170 of the platen 152. The element 154 has a generally curved or rounded outer surface 172 with convex curvature projecting upwardly from the bearing surface 170 of the platen 152 in a direction parallel to the drive axis 112. The outer surface 172 may be generally frustoconical in shape and is centered with respect to platen 152, and also the shaft 160 that is extended through the centering element 154 and protrudes upwardly from the outer surface 172. The element 154 therefore defines circles of decreasing radius in successive planes extending normally or perpendicular to the drive axis 112 from the platen 152 to the tip of the cone. That is, the centering element 154 has a maximum diameter measured in a plane perpendicular to the drive axis 112 near the platen 152 (or generally parallel to and flush with the platen bearing surface 170), a minimum diameter at its end opposite the platen 152, and a gradually reduced diameter from the maximum to the minimum diameter in the axial direction of the drive axis 112 extending away from the platen 152. With strategic selection of the maximum and minimum diameters, the centering element 154 may engage different wheel rims having much variation in the wheel mount hub mount pad 164.

The centering element 154 projecting upwardly from the platen 152 is accordingly situated to engage the center bore 162 of the wheel rim hub mount pad 164 (FIGS. 4 and 5) from the inner side 166, as opposed to the outer side 168. Further, the wheel rim hub mount pad 164 is generally self-centered on the outer surface 172 of the centering element 154 as the wheel rim hub mount pad 164 is brought into surface contact with the bearing surface 170 of the platen 152 and clamped thereto as described below.

The outer surface 172 of the centering element 154 may further include, as shown in FIGS. 2 and 3, an indented region 174 defining an incontinuity in the curvature of the outer surface 172. In the example shown, while the outer surface 172 has a convex curvature, the indented region has a concave curvature. The region 174 provides a recess or pocket in a portion of the centering element 154 to accommodate the pivot arm 156 and anti-rotate pin 158 to be positioned alongside the centering element 154 in a relatively compact arrangement.

In various embodiments, the cone shaped centering element 154 may be formed from a heavy duty plastic material or other suitable material known in the art. The centering element 154 may likewise be removable from the platen 152 and the shaft 160 when not needed. In another embodiment, the centering element 154 may be permanently attached, or at least not intended for removal by the machine operator, from a remainder of the clamping mechanism 150. Additionally, the centering element 154 may be mechanically anchored to the drive shaft assembly 104 such that the centering element 154 rotates in unison with the platen 152 and the shaft 160 as the machine 100 (FIG. 1) is used. That is, the centering element 154 is rotatable about the drive axis 112 as the drive assembly 104 is actuated.

The pivot arm 156 includes a relatively large surface area 176 that is generally flush with the bearing surface 170 of the platen 152. The surface area 176 is sometimes referred to as a "land" and is provided to make initial surface contact with the inner side 166 of the wheel rim hub mount pad 164 as the wheel rim 106 is mounted to the drive assembly 104. The surface area 176 in the example shown is generally crescent shaped (i.e., has a generally circular shape with a smaller circular shaped piece removed), while other geometric configurations are possible.

The pivot arm 156 is rotatably mounted to the platen 152 such that that the anti-rotate pin 158 carried on the pivot arm 156 is selectively positionable to various radial distances from the center axis 112. FIG. 2, for example, illustrates the pivot arm 156 in a first position wherein the anti-rotate pin 158 is generally positioned at an inner radius of the annular platen 152. In the exemplary position shown in FIG. 3, however, the pivot arm 156 is pivoted or rotated to position the anti-rotate pivot pin 158 at a radial position outwardly spaced from the inner periphery of the platen 152. While two exemplary positions of the anti-rotate pivot pin 158 and pivot arm 156 are shown, others are of course possible.

The anti-rotate pin 158 is carried on the pivot arm 156 and is generally positionable by moving the pivot arm 156 to accommodate different radii of lug bolt circles for the lug holes 178 (FIG. 5) in any given hub mount pad 164, which may vary amongst different wheel rims 106. The pin 158 is positioned to extend though one of the lug holes 178 from the back or inner side 166 of the wheel rim hub mount pad. As shown in FIG. 4, the anti-rotate pin 158 may include a compression spring 180 or other biasing element providing an axial force in an upward direction to further assist in locating the pin 158 in one of the lug holes 178 in the hub mount pad 164. More specifically, the spring 180 may allow the pin to retract under the weight of the wheel rim 106, and then spring into engagement with a lug hole 178 when the pin 158 is in the corresponding position. The anti-rotate pin 158 and pivot arm 156 may be fabricated from suitable materials known in the art according to known techniques.

In one embodiment, the pivot arm 156 and anti-rotate pin 158 are permanently attached to the platen 152, or at least not intended for removal. As such, the arm 156 and pin 158 are integrated in the machine structure and need not be separately attached or anchored to the remainder of the mechanism 150 in use. In another embodiment, the arm 156 and pin 158 may be removable as desired.

FIGS. 4 and 5 illustrate an exemplary operation of the center clamp mechanism 150 to mount a wheel rim 106 to the drive assembly 104. The wheel rim 106 is shown with the shaft 160 extended through the center bore 162 of the hub mount pad 164 and the outer surface 172 of the centering element 154 engaging the center bore 162. The wheel rim 106 is further shown in a tilted position in FIG. 4 wherein a portion of the inner side 166 of the hub mount pad 164 is placed in surface contact with the "land" surface area 176 of the pivot arm, but generally not in surface contact with the bearing surface 170 of the platen 152. In other words, in the tilted position, the rotational axis of the wheel rim 106 is oblique to the drive axis 112 of the drive assembly 104. By merely rotating the wheel rim 106 in this position (in either a clockwise or counter-clockwise direction as appropriate), the pivot arm 156 may be automatically rotated via its surface contact with the wheel mount hub mount pad 164, and the anti-rotate pin 158 may be positioned to the correct radius to engage a lug hole 178 as the pivot arm 156 is moved. The bias of the anti-rotate pin 158 may assist with actually locating the pin 158 in the lug hole 178 once in place. The engagement of the pin 158 with a lug hole 178 may be accomplished rather easily and intuitively by a machine operator, without having to reach through or underneath the wheel rim 106 to adjust a position of the pin 158.

Figures 6, 7:
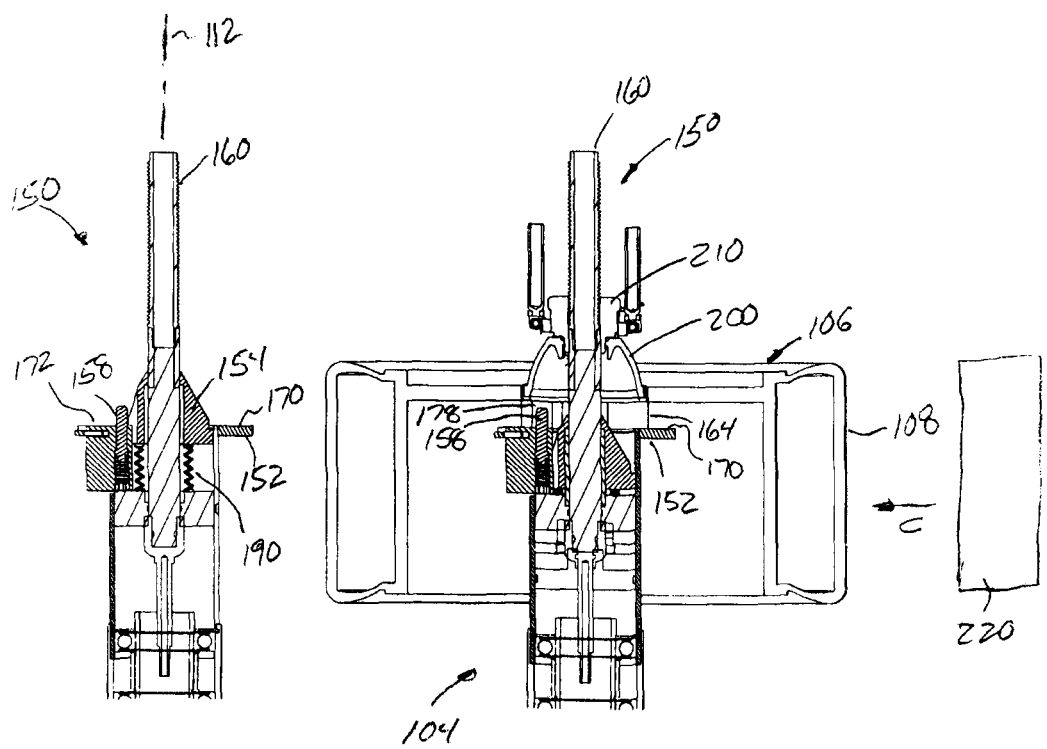
FIG. 6 is a partial sectional view of the clamping mechanism with a wheel rim and tire retained thereto.
FIG. 7 is a sectional view illustrating the wheel rim and tire in a clamped position utilizing a clamping accessory.

As further shown in FIG. 6, the centering element 154 may further be provided one or more bias elements 190 such as a pair of compression springs. The bias elements 190 provide a degree upwardly directed axial force to the centering element 154 in a direction parallel to the drive axis 112 such that the machine operator need not support the full weight of the wheel rim 106 and tire 108 when engaging the anti-rotate pin 158. Even for heavy wheel rim and tire combinations, the bias elements 190 may allow the wheel rim and tire to float or levitate on the springs and facilitate rotation of the wheel rim 106 and tire 108 to engage the anti-rotate pin 158 in one of the lug holes 178 with relative ease that would not otherwise be possible under the full weight of the wheel and resultant frictional forces.

FIG. 7 shows the wheel rim 106 and tire 108 in a centered and clamped position on the mechanism 150. The anti-rotate pin 158 is shown engaged in the lug hole 178 and the inner side 166 (FIG. 4) of the wheel mount hub mount pad 164 is shown at rest on the bearing surface 170 of the platen. An accessory 200 is shown engaging the outer side 168 (FIG. 4) of the wheel mount hub mount pad 164, and a threaded coupler 210 is shown engaged to the shaft 160 and in contact with the accessory 200. A clamping force, generated in an axial direction parallel to the drive axis 112, is generated on the wheel mount hub mount pad 164 with the hub mount pad 164 accurately centered in position. Relatively complicated mechanisms to center the wheel rim 106 by applying radial force to the outer periphery of the wheel rim 106 are avoided in favor of a simpler and easier to use mechanism 150.

While a cone-shaped accessory 200 is shown it is recognized that various alternative configurations of accessories could be utilized, including but not limited to a cup-shape, a pressure ring, or a flange plate with fingers that contact the lug holes 178. Such accessories may be made of plastic and are provided to more evenly distribute contact forces on the outer side 168 of the wheel mount hub mount pad 164 to minimize any likelihood of potential damage thereto. The desirability of such accessories will vary depending on specific wheel rim configurations and dimensional aspects thereof. For certain types of wheel rims, however, accessories such as the accessory 200 may be considered entirely optional and need not be utilized. That is, the coupler 210 may directly contact the outer side 168 of the hub mount pad 164 in use.

The coupler 210 may be recognized in the exemplary embodiment shown as a "speed nut" that is conveniently engaged to the threaded shaft 160 and turned or tightened to generate a clamping force acting on the hub mount pad 164. The clamping force may, as shown in FIG. 7, counteract the bias elements 190 (also shown in FIG. 6) and effectively mechanically isolate them from the mechanism 150. While an exemplary coupler 210 is shown in FIG. 7, other types of couplers may be used. As the coupler 210 is tightened, any off-centeredness of the wheel rim 106 is naturally, and automatically, corrected via the centering element 154 acting on the center bore 162 from the inner side 166 of the hub mount pad 164. That is, after the anti-rotate pin 158 is engaged, centering of the wheel rim 106 is accomplished without input by the operator other than engaging the coupler 210.

When clamped as shown in FIG. 7, the wheel rim 106 and tire 108 are accurately centered and ensured to rotate in unison with the drive assembly, and are further ensured to remain centered with respect to the drive axis 112 as the machine 100 operates. Relative slipping and rotation of the wheel rim 106 with respect the platen 152 is prevented via the anti-rotate pin 158 so that operation of the machine tools is not compromised.

The clamping mechanism 150 may be enhanced with additional action of the drive assembly 104, and specifically via retraction of the drive shaft to clamp the hub mount pad 164 to the platen 152, as described in the commonly owned U.S.

patent application Ser. No. 12/358,760 filed Jan. 23, 2009, the disclosure of which is hereby incorporated by reference in its entirety. As described therein, a portion of the drive shaft assembly 104 may be retracted along the longitudinal axis of the drive axis 112 to generate adequate axial clamping force and pressure on the wheel rim hub mount pad 164 so that the wheel rim 106 may be spun about the drive axis 112 for removal and installation of a tire without slippage of the rim 106. Such an enhanced clamping mechanism is not as dependent on the operator to tighten the coupler 210 sufficiently to generate an adequate clamping force, and also when necessary can generate clamping forces well exceeding what a typical machine operator could manually provide.

It may be recognized from FIG. 7, that the wheel rim 106 is mounted to the drive assembly 104 in a manner similar to that in which the wheel rim 106 is mounted to a vehicle, while still being rather easily and accurately centered with respect to the drive axis 112. This provides still further benefits. For example, a load roller 220 may be provided on the machine 100 to apply a radially directed load force in the direction of Arrow C to the tire 108 and facilitate detection of a tire non-uniformity. U.S. patent application Ser. No. 12/495,847 describes such a load roller and detection of tire uniformity characteristics and is hereby incorporated by reference in its entirety. Accurate centering of the wheel rim 106, and maintaining its position under force from the load roller 220, is especially important when assessing or evaluating tire uniformity characteristics. Unlike conventional clamping mechanisms on existing and conventional tire changer machines, the center clamp mechanism 150 capably delivers on both counts.

Figure 8:
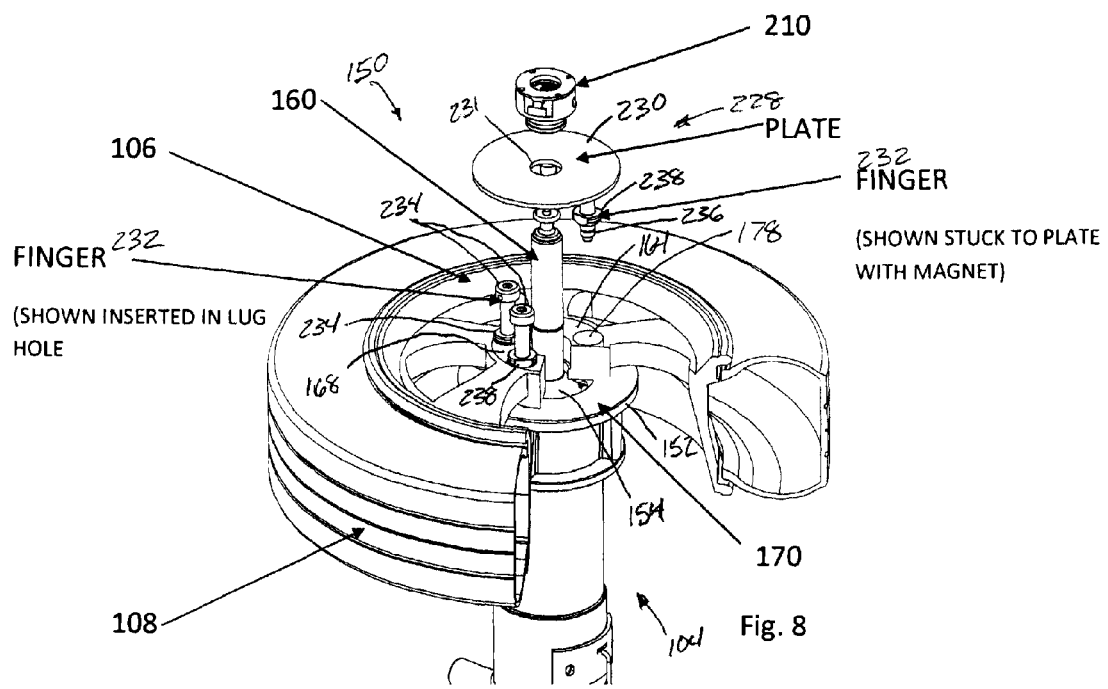
FIG. 8 is a perspective view partly broken away illustrating an alternative clamping accessory arrangement in exploded view.
Figure 9:
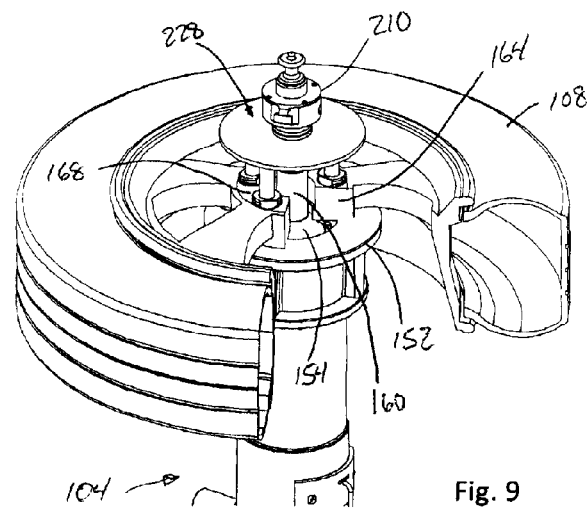
FIG. 9 illustrates the arrangement shown in FIG. 8 in a clamped position.

FIGS. 8 and 9 illustrate another clamping arrangement on a center clamp mechanism otherwise similar to that shown in FIG. 6. Thus, like reference characters are utilized in FIGS. 6 and 8 to denote like features of the mechanism. Comparing FIGS. 8 and 9 to the previous figures, it can be seen that an alternative clamping accessory 228 is used in lieu of the accessory 200 shown in FIG. 7. The clamping accessory 228 is provided with a specific view toward plastic clad alloy wheel rims now commonly provided as original equipment on modern vehicles and also available as aftermarket modification.

With the advent of plastic clad alloy wheel rims to the industry, a machine operator is required to take greater care not to clamp the wheel on a tire changer machine in such a way as to damage the decorative plastic cladding. The plastic cladding tends to be more delicate than conventional non-cladded wheel rims, and hence is more easily damaged when changing tires. Traditional table top tire changer machines can clamp the wheel rim on the outer perimeter of the inside flange of the wheel, and therefore presents little concern and minimal potential to damage to a clad wheel. For a state of the art tire changer machine (e.g., the machine 100) having a center clamp mechanism (e.g., the center clamp mechanism 150) however, the use of a configurable flange plate accessory has become the norm to provide a safe way of clamping plastic clad wheels without damage.

Known configurable flange plate accessories for tire changer machines typically can be configured with different numbers of fingers projecting therefrom that interfit with the lug holes in the wheel rim hub mount pad when mounted to the tire changer machine. Further, the fingers are adjustable to locate them along a circle that matches the bolt hole circle of the hub mount pad of the wheel rim having the tire to be changed. The flange plates, and specifically the fingers, are therefore adjustable to fit a variety of wheel rim hub mount pads having different lug bolt hole circles.

Once a flange plate has been configured with the fingers in the correct locations to match the lug holes in the wheel rim hub mount pad, the fingers are extended through the lug holes and the plate overlies the outer side of the hub mount pad. The coupler, which may be a speed nut as described above, is then tightened against the flange plate. The clamping force is distributed through the plate and its fingers, and the force experienced by the plastic cladding is no more than, and likely even less than, the force applied when the hub mount pad is bolted to the vehicle.

Conventional flange plate accessories can be effective to protect cladded rims during tire changing, but they can be cumbersome to use and time consuming to configure. The plates and fingers also tend to be rather sturdy and expensive, precision made parts with tight manufacturing tolerances that serve to accurately center the wheel rim hub on the drive axis of the machines. Accordingly the use of conventional configurable flange plates increases the cost of using known tire changer machines and impairs efficient use of known tire changer machines.

FIGS. 8 and 9 illustrate a self-configuring flange plate accessory 228 that greatly simplifies its specific adaptability to wheel rims of different types, and solves the cumbersome and time consuming process of mounting clad wheels with a conventional configurable flange plate and existing tire changer machines. The self-configuring flange plate accessory 228 is illustrated with the back-cone clamping mechanism 150 described above, and is especially useful therewith for changing tires on cladded rims. Because the center clamp assembly 150 provides accurate centering of the wheel rim 106 on the drive assembly 104, the flange accessory 228 need not be manufactured to as rigorous specifications as existing configurable flange plate accessories that serve to center the wheel rim as well as protect cladding on the wheel rim, and as such can be provided at much lower cost.

While described and illustrated in combination with the center clamp mechanism 150, it is contemplated that the benefits of the self configuring flange plate accessory 228 as described below does not require the back cone center clamping mechanism 150. That is, the self configuring flange plate accessory 228 does not necessarily require the centering element 154 described above to be present for some of its benefits to be realized.

The self configuring plate accessory 228 generally includes a plate 230 and a plurality of fingers 232. In the exemplary embodiment shown, the plate 230 is a generally flat plate having a center bore 231 through which the threaded shaft 160 may be extended as the wheel rim 106 is clamped. The fingers 232 in the example shown include a head 234 at one end, a contoured tip or end 236 for engaging the wheel rim lug hole opposite the head, and a slip ring 238 used to maintain the finger assembly in an upright stance by engaging the outer rim of the lug hole 178. The fingers 232 are elongated and resemble bolts. The contoured end 236 of each finger 232 is insertable into one of the lug holes 178 of the wheel rim hub mount pad 164, and the slip ring 238 rests on the outer side 168 of the hub mount pad 164. The head 234 of each finger 232 provides a contact area upon which the plate 230 rests. When the coupler 210 is attached to the threaded shaft 160, it is tightened down in contact with the plate 230 and generates a clamping force. The clamping force is transmitted from the plate 230 to the fingers 232 via the heads 234, and the contoured ends 236 in turn apply the clamping force to the lug hole in the mount pad 164.

In an exemplary embodiment, the plate 230 may be fabricated from a ferromagnetic material while the fingers 232 are magnetized. The fingers 232 therefore couple to the plate 230 with magnetic contact force and are easily arranged in different relative locations on the plate 230. Moreover, magnetic coupling of the fingers 232 allows the accessory 228 to be self configurable to the wheel rim 106. The fingers 232 may be simply dropped into the lug holes 178 of the wheel rim hub mount pad 164 as shown in FIG. 8. Once the fingers 232 are positioned in the lug holes 178 with the slip rings 238 slid down to rest on the outer side 168 of the hub mount pad 164, the plate 230 is lowered down onto the heads 234 of the fingers 232, and magnetic force couples the fingers 232 to the plate 230. As such, the fingers 232 need not be pre-positioned in precise, predetermined locations on the plate 230 prior to use of the accessory 228. Rather, the fingers 232 are attachable to the plate 230 wherever contact with the plate 230 is made. Alternatively stated, for the purposes presently described, the actual location of the points of contact between the fingers 232 and the plate 230 is not of great concern. As long as the fingers 232 contact the plate 230, clamping forces may be distributed to the plate 230, especially when the centering element 154 as described above is employed to reliably and accurately center the wheel rim 106 in a manner independent of the accessory 228.

The coupler 210 is then installed on the shaft 160 and tightened in a clamped position generating an downwardly directed clamping force on the plate 230 as shown in FIG. 9, which then can be evenly distributed through the fingers 232 to the hub mount pad 164. The clamping can be done very quickly using the accessory 228. The machine operator need not know the actual bolt hole circle of the hub mount pad 164 to use the accessory 164, nor configure the accessory 228 prior to its use. A substantial reduction in time needed to change a cladded rim is realized, using much lower cost and easier to use accessory parts than conventional configurable flange plates.

In one exemplary embodiment, the head 234 of the fingers 230 include permanent magnets that couple the fingers 232 to the plate 230 as the accessory is used. That is, a relatively small portion of the fingers 232 are actually magnetic in such an embodiment, providing further reduction in cost of the accessory 228. The size and/or strength of the magnets utilized can be strategically selected to increase or decrease the magnetic force coupling the fingers 232 to the plate 230. In another embodiment, more than one magnet may be used on or in each finger 232, and the entirety of the fingers 232 can be magnetized in still another embodiment.

It is also possible as well for the magnetic coupling arrangement to be reversed from that described above. That is, the plate 230 (or portions thereof) can be magnetized while the fingers 230 (or portions thereof) may be fabricated from a ferromagnetic material such that magnetic attraction and force couples the plate 230 and the fingers 232.

Still other variations are possible. Magnetic coupling elements may be separately provided from the fingers 232 and the plate 230 that are each otherwise fabricated from ferromagnetic materials. When the magnetic coupling pieces are placed between the fingers 232 and the plate 230, mutual magnetic attraction to the fingers and the plate will occur. In another contemplated embodiment, both the fingers 232 and the plate 230 could be magnetized (partially or completely) in a manner the fingers 232 and the plate 230 are magnetically attracted to one another.

By coupling the fingers 232 and the plate 230 with the fingers 232 already in place in the lug holes 178, the accessory 228 need not be configured in advance. Moreover, because of the magnetic coupling, when the plate 230 is removed the fingers 232 are also removed while remaining in place and in position on the plate 230. Thus, for example, when changing a set of tires on a single vehicle, the spacing of the fingers 230 is retained for even faster setup on the next wheel rim of the same type. As long as the current wheel rim is of the same type as the one previously changed, the accessory 228 can be used without detaching the fingers 232 from the plate 230. Rather, the fingers 232 will already be in the correct position and the fingers may simply be inserted through the lug holes 178 while the fingers 232 remain coupled to the plate 230.

In still another contemplated scenario, the fingers 232 could be utilized with the plate 230 without coupling of any kind occurring, whether magnetic or otherwise. That is, the fingers 232 need not attach to the plate 230 and be removable with the plate 230 in a retained position as described above. In such an embodiment, the fingers 232 could be re-inserted into the lug holes of successive wheel rims, whether or not they are the same as in the previously completed tire changes. A slightly longer time to re-install the fingers 232 would be required, but is not difficult in such an embodiment.

The plate 230 and the fingers 232 may be provided as an accessory kit for use to clamp cladded rims as described. Different types or dimensions of fingers 232 may be provided for different types and sizes of wheel rims 106. Different sizes of plates 230 may likewise be provided and be interchangeably used with any of the fingers 232. Any number of fingers 232 may be provided.

While the accessory 228 is particularly beneficial for use with cladded wheel rims, it is understood that the accessory 228 may be used with non-cladded wheel rims. The convenience 228 and versatile setup of the accessory 228 to change a variety of different tires on different wheel rims extends generally to rims of all types.

The benefits and advantages of the inventive concepts described are now believed to have been amply illustrated in relation to the exemplary embodiments disclosed.

An embodiment of a tire changer machine for changing a tire on a wheel rim has been disclosed. The wheel rim includes a wheel mount hub mount pad having an inner side, an outer side and a center bore, and the machine includes: a base; a drive assembly coupled to the base and configured to rotate a wheel rim and associated tire about a rotational axis; and a center clamp mechanism coupled to the drive assembly and comprising: a platen configured to support the inner side of the wheel rim hub mount pad; and a centering element projecting outwardly from the platen and configured to engage the center bore from the inner side of the wheel mount hub mount pad.

Optionally, the tire changer machine may further include a threaded shaft extending from the centering element. A coupler may be engageable to the shaft and movable toward the outer side of the wheel rim hub mount pad. The centering element may be removable. The platen may define a bearing surface to support the inner side of the wheel mount hub mount pad. The bearing surface may be annular. The platen may define a recess proximate the bearing surface, and the clamp mechanism may further include a pivot arm situated in the recess. An anti-rotate pin may be carried on the pivot arm.

The centering element may define a conical outer surface, and the outer surface may include an indented region proximate the recess. The center clamp mechanism may also include an anti-rotate pin, wherein the anti-rotate pin projects upwardly from and is configured to engage a lug hole of the wheel rim hub mount pad from the inner side. A pivot arm may be included, with the anti-rotate pin coupled to the pivot arm, and a radial position of the pivot arm relative to the drive axis being determined by the pivot arm. The pivot arm may define a contact surface for engagement with the inner side of the wheel rim hub mount pad, whereby operator rotation of the wheel rim with the pivot arm in contact with the inner side causes the radial position of the anti-rotate pin to automatically adjust. The contact surface may be crescent shaped.

At least one bias element associated with the anti-rotate pin, and at least one bias element associated with the centering element, with the at least one compliant element supporting the weight of the wheel rim and tire as it is positioned on the clamping mechanism. An accessory configured to engage the outer side of the wheel rim hub mount pad. The centering element may include a frustoconical outer surface. The tire changer machine may also include a load roller configured to apply a radially directed force to the tire when clamped to the drive axis. A flange plate and at least one finger configured to provide a magnetic coupling therebetween may also be provided.

Another embodiment of a tire changer machine for changing a tire on a wheel rim has been disclosed. The wheel rim includes a wheel mount hub mount pad having an inner side, an outer side and a center bore, and the machine includes: a base; a drive assembly coupled to the base and configured to rotate a wheel rim and associated tire about a rotational axis; and a center clamp mechanism coupled to the drive assembly and comprising: a platen configured to support the inner side of the wheel rim hub mount pad; a centering element projecting outwardly from the platen and configured to engage the center bore from the inner side of the wheel mount hub mount pad; and at least one bias element providing an axial force on the centering element, whereby the at least one bias element supports at least a portion of the weight of the wheel rim when the hub mount pad of the wheel rim engages the centering element.

Optionally, the at least one bias element may include a compression spring. The centering element may be cone-shaped. An anti-rotate pivot pin may be situated proximate the platen and configured to engage a lug hole of the hub mount pad from the inner side. The tire changer machine may further include a pivot arm, with the pivot pin carried on the pivot arm, and the radial position of the pin relative to the rotational axis being adjustable via the pivot arm. The pivot arm may define a contact area for engagement with the inner side of the hub mount pad, whereby rotation of the wheel rim automatically causes the pivot arm to move and adjust the radial position of the anti-rotate pin. A bias element may be associated with the anti-rotate pin, and the bias element may be a compression spring. A flange plate and at least one finger configured to provide a magnetic coupling therebetween may also be provided.

Another embodiment of a tire changer machine for changing a tire on a wheel rim has been disclosed. The wheel rim includes a wheel mount hub mount pad having an inner side, an outer side and a center bore, and the machine includes: a base; a drive assembly coupled to the base and configured to rotate a wheel rim and associated tire about a rotational axis; and a center clamp mechanism coupled to the drive assembly and comprising a centering element configured to engage the center bore from the inner side of the wheel mount hub mount pad.

Optionally, at least one bias element may provide an axial force on the centering element, whereby the at least one bias element supports at least a portion of the weight of the wheel rim when the hub mount pad of the wheel rim engages the centering element. The tire changer machine may also include a platen configured to support the inner side of the wheel rim hub mount pad, with the centering element extending outwardly from the platen. The centering element comprises a cone-shaped outer surface. An anti-rotate pin may be configured to engage a lug hole of the hub mount pad from the inner side, and a radial position of the anti-rotate pin relative to the rotational axis may be adjustable. A radial position of the anti-rotate pin may be automatically adjustable via rotation of the wheel rim. A flange plate and at least one finger configured to provide a magnetic coupling therebetween may also be provided.

Another embodiment of a tire changer machine for changing a tire on a wheel rim has been disclosed. The wheel rim includes a wheel mount hub mount pad having an inner side, an outer side and a plurality of lug holes, and the machine includes: a base; a drive assembly coupled to the base and configured to rotate a wheel rim and associated tire about a rotational axis; and a center clamp mechanism coupled to the drive assembly and comprising a flange plate a plurality of fingers attachable to the flange plate while the fingers occupy the lug holes of the hub mount pad.

Optionally, the plate and the fingers are configured to provide a magnetic coupling therebetween. The plate may be fabricated from a ferromagnetic material. The fingers include may include a magnet. The center clamp mechanism may further include a centering element configured to engage the center bore from the inner side of the wheel mount hub mount pad.

An embodiment of a flange plate accessory kit for changing a tire on a wheel rim with a tire changer machine has also been disclosed. The wheel rim includes a wheel mount hub mount pad having an inner side, an outer side and a plurality of lug holes, and the kit includes: a plate dimensioned to overlie the outer side of the wheel rim hub mount pad; and a plurality of fingers separately provided from the plate and dimensioned to extend into the lug holes.

Optionally, the fingers and the plate are magnetically attracted to one another, whereby the fingers can be coupled to the plate after the fingers occupy the lug holes. At least one of the fingers may include a head, and a magnet located proximate the head. The plate may be fabricated from a ferromagnetic material. The fingers may each include a contoured end and a slip ring on the contoured end, with the slip ring locatable on the outer side of the hub mount pad. The plate may include a central bore dimensioned to receive a shaft of a center clamp mechanism of a tire changer machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tire changer machine for changing a tire on a wheel rim, the wheel rim including a hub mount pad having an inner side, an outer side and a center bore extending between said inner side and said outer side, and the tire changing machine comprising:
   a base;
   a drive assembly coupled to the base and configured to rotate a wheel rim and associated tire about a rotational axis; and
   a center clamp mechanism coupled to the drive assembly said center clamp mechanism including
   an adjustable anti-rotate pin;

a platen having a bearing surface configured to support the inner side of the hub mount pad; and a centering element projecting coaxially away from the platen bearing surface along said rotational axis, said centering element having a lower base adjacent said platen bearing surface, and an upper base axially displaced away from said platen bearing surface, said lower base having greater radial dimension than said upper base, such that said centering element tapers from said lower base to said upper base and inwardly towards said rotational axis from to engage the wheel rim hub mount pad center bore from the inner side of the hub mount pad; and wherein said lower base includes an indented region with a concave curvature providing clearance for said adjustable anti-rotate pin.

2. The tire changer machine of claim 1, wherein said centering element is removable.

3. The tire changer machine of claim 1, wherein said centering element comprises a frustoconical outer surface extending between said lower base and said upper base.

4. The tire changer machine of claim 1, further comprising at least one bias element providing an axial force on said centering element, whereby said at least one bias element supports at least a portion of the weight of the wheel rim when the hub mount pad of the wheel rim engages said centering element.

5. The tire changer machine of claim 1, wherein the centering element comprises a cone-shaped outer surface extending between said lower base and said upper base.

6. A method of changing a tire on a wheel rim utilizing a tire changer machine, the wheel rim including a hub mount pad having an axial inner side, an axial outer side, and a plurality of lug holes and a center bore passing each extending from the axial inner side to the axial outer side; and the tire changing machine including a base, a drive assembly coupled to the base, and a center clamp mechanism coupled to the drive assembly, the center clamp mechanism including a platen, an adjustable anti-rotate pin, and a centering element having an indented region having a concave curvature providing clearance for said adjustable anti-rotate pin; the method comprising:

engaging the centering element with the center bore of the hub mount pad from the axial inner side of the hub mount pad;

engaging the adjustable anti-rotate in with one of said plurality of lug holes from the axial inner side of the hub mount pad;

positioning the axial inner side of the hub mount pad on the platen while the the centering element engages the center bore of the hub mount pad;

clamping the hub mount pad to the drive assembly by urging the hub mount pad into engagement with the platen with the center clamp mechanism; and rotating, with the drive assembly, the wheel rim and associated tire about a rotational axis coaxial with said centering element of said center clamp mechanism.

7. The method of claim 6 wherein clamping the hub mount pad to the drive assembly includes applying a clamping force to the outer side of the hub mount pad to urge the hub mount pad towards the platen and into centered engagement with the centering element.

8. The method of claim 6 wherein clamping the hub mount pad resiliently displaces the centering element axially along said rotational axis towards the platen and positions the inner side of the hub mount pad on the platen.

9. The method of claim 6 further including aligning an anti-rotate pin with a lug hole of the hub mount pad while engaging the center bore of the hub mount pad with the centering element.

10. The method of claim 9 further including supporting at least a portion of the weight of the wheel rim on the centering element prior to clamping the hub mount pad to the drive assembly; and wherein aligning the anti-rotate pin includes rotating the wheel rim about the rotational axis.

11. The method of claim 9 wherein aligning the anti-rotate pin with a lug hole includes selecting a radial position of the anti-rotate pin by rotating the anti-rotate pin about an axis parallel to the rotational axis.

12. The tire changer machine of claim 1 wherein said anti-rotate pin is mounted to an arm for altering a radial position relative to said rotational axis, said anti-rotate pin projecting away from the platen bearing surface, parallel to said rotational axis, to engage a lug hole of the wheel rim.

13. The tire changing machine of claim 12 wherein an outer surface of said centering element is resected in proximity to said pivot arm.

\* \* \* \* \*